United States Patent
Kwan et al.

(10) Patent No.: US 10,785,672 B2
(45) Date of Patent: Sep. 22, 2020

(54) DYNAMIC WIRELESS NETWORK TOPOLOGY FOR REDUCED SPECTRUM FLOODING

(71) Applicant: WiSilica Inc., Laguna Hills, CA (US)

(72) Inventors: Dennis Ching Chung Kwan, San Diego, CA (US); Suresh Kumar Singamsetty, Aliso Viejo, CA (US)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 16/127,420

(22) Filed: Sep. 11, 2018

(65) Prior Publication Data

US 2020/0084654 A1   Mar. 12, 2020

(51) Int. Cl.
| | |
|---|---|
| *H04W 28/02* | (2009.01) |
| *H04W 8/22* | (2009.01) |
| *H04L 12/44* | (2006.01) |
| *H04W 88/04* | (2009.01) |
| *H04W 84/20* | (2009.01) |

(52) U.S. Cl.
CPC .......... *H04W 28/021* (2013.01); *H04L 12/44* (2013.01); *H04W 8/22* (2013.01); *H04W 84/20* (2013.01); *H04W 88/04* (2013.01)

(58) Field of Classification Search
CPC ..... H04W 48/10; H04W 48/14; H04W 12/04; H04W 4/80; H04W 76/14; H04W 84/18; H04L 45/32; H04L 63/0428; H04L 69/22
See application file for complete search history.

(56) References Cited

U.S. PATENT DOCUMENTS

| | | | | |
|---|---|---|---|---|
| 8,848,584 B2* | 9/2014 | Shin | ............... | H04J 3/0679 370/311 |
| 2005/0030967 A1 | 2/2005 | Ohmi et al. | | |
| 2005/0037789 A1 | 2/2005 | Rhee et al. | | |
| 2007/0070937 A1* | 3/2007 | Demirhan | ............. | H04W 72/06 370/328 |
| 2009/0138617 A1* | 5/2009 | Veillette | ................ | G01D 4/004 709/238 |
| 2010/0098102 A1* | 4/2010 | Banks | ............... | H04W 52/0235 370/406 |
| 2013/0278412 A1 | 10/2013 | Kelly et al. | | |
| 2015/0092530 A1* | 4/2015 | Kelsey | ................ | H04W 40/244 370/216 |
| 2017/0346673 A1 | 11/2017 | Kneckt et al. | | |

* cited by examiner

*Primary Examiner* — Curtis A Alia
(74) *Attorney, Agent, or Firm* — Rowan TELS LLC

(57) ABSTRACT

In some configurations, the method of operating a system with dynamic wireless network topology with reduced spectrum flooding involve scanning with a first device in mesh network for beacon packets from other devices in the mesh network during a random back off period. In response to the first device not receiving a beacon packet from the other devices during the random back off period, the first device initiates an election protocol by sending an election protocol packet with its unique election protocol identifier to the other devices. In response to receiving a beacon packet from a second device, the first device stores the unique node identifier, assigns the second device as a leader node device, retransmits the unique node identifier of the second device and leader node information in a protocol packet. A command packet is communicated through the mesh network by way of at least one leader node device.

12 Claims, 12 Drawing Sheets

DYNAMIC WIRELESS NETWORK TOPOLOGY FOR REDUCED SPECTRUM FLOODING

BACKGROUND

Node devices in a mesh network connect directly, dynamically and non-hierarchically to as many other nodes as possible and cooperate with one another to efficiently route data from/to clients. This lack of dependency on one node allows for every node to participate in the relay of information. In wireless mesh networks, the participation of every node device in the communication of information across the wireless network can lead to spectrum flooding, where every device is broadcasting the same information on crowding the wireless spectrum and reducing the usable bandwidth for the communication of other information. Due to the nature of mesh networks, the more devices that are participating in the network the more bandwidth is utilized by the devices attempting to relay information between two non-directly linked devices. Therefore a need exists for reducing bandwidth utilization while relaying information across a mesh network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
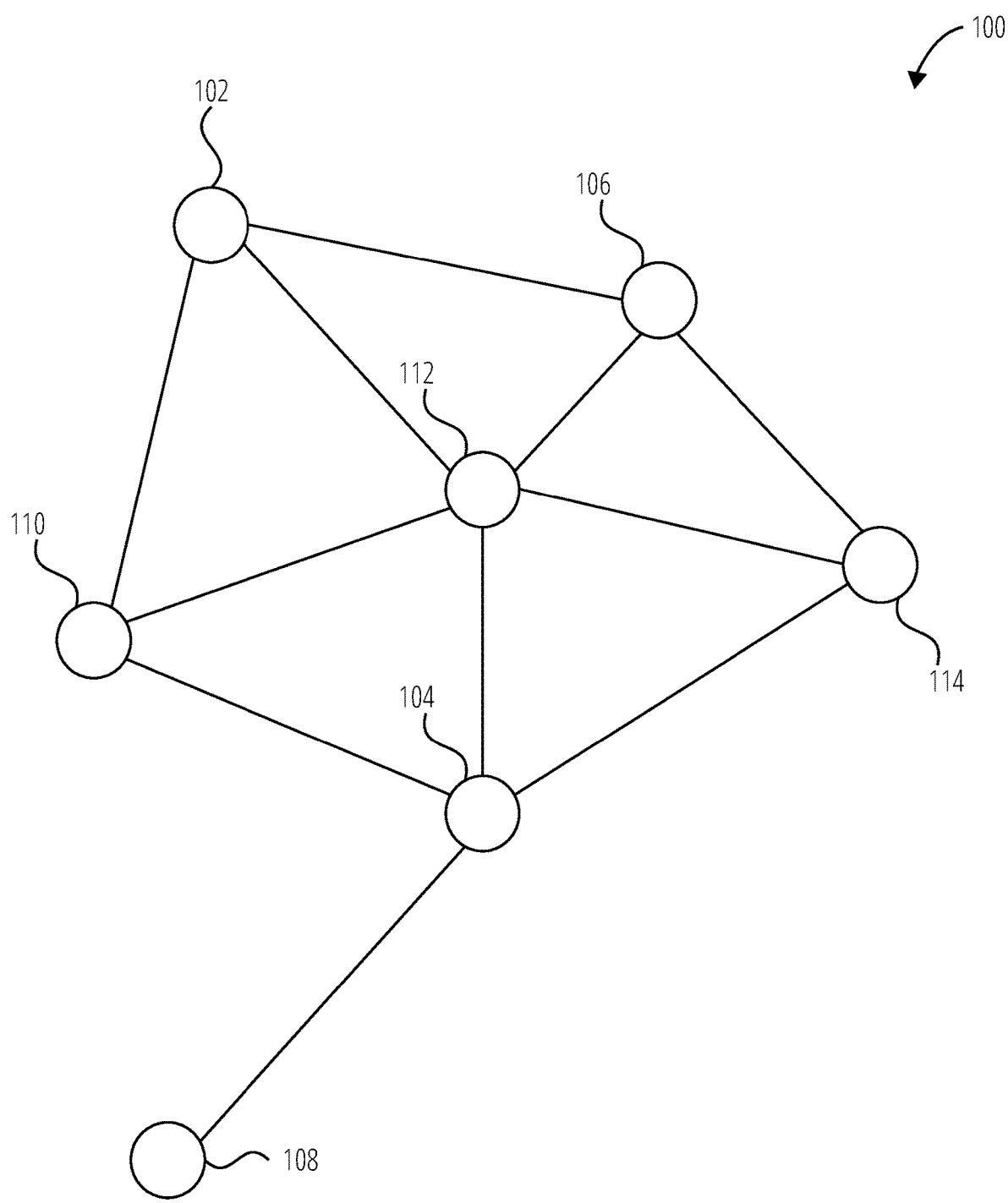
FIG. 1 illustrates a wireless mobile mesh network 100 in accordance with one embodiment.

The system and method relate to a dynamic non-flooding topology that enables convenient pathways for communication between a transmitting node and a receiving node involving small sets of selection and communication of and between a number of master nodes among various arbitrary devices present in the network.

This is achieved by electing one device as the Root and a few devices as Leaders, such that all devices in the mesh are reachable via these designated devices. Only the Root and Leaders will retransmit (forward) packets in the mesh. This significantly minimizes packet collision and flooding of packets in the mesh as compared to a conventional flooded mesh where every device retransmits packets. The root device sends beacons (Keep-Alive packets) at regular interval to indicate that it is functional. The beacon packets are retransmitted by all the devices in the mesh to maintain the status of Root and Leaders. If the beacons are not detected for a specified amount of time (depending on the network parameters) a new election process is triggered. Thus, election enables the network to self-heal and reconfigure when devices fail.

The devices in a network take on the following states.
1. Participating device $P_D$: A device which is already part of an elected network and is executing any of the following roles:leader node ($L_N$): Device that participate in re-transmitting data packets in network. Reducing the number of leaders optimize the traffic in the network and avoid flooding in the network. Leaf Node ($l_N$): Device that does not participate in re-transmitting the data packets in network. Root Node ($R_N$): A leader node with the additional responsibility of initiating a protocol packet to identify the connectivity between the various devices in the formed network.
2. Non-Participating ($NP_D$): A fresh device which is powered ON.
3. Quasi State ($QS_D$): A device which should participate in the election protocol but is not able to communicate with devices higher in the hierarchy.

A formation algorithm executed in a dynamic mesh network of devices may proceed as follows:
4. A device $D_N$ will scan for beacon packets for a random back off period. If $D_N$ does not receive any beacon packets during this period, $D_N$ will initiate an election protocol by sending an election protocol packet comprising a unique election protocol identifier $E_{id}$ for the device $D_N$. This unique identifier can be assigned to $D_N$ during commissioning of $D_N$ in the network. If $D_N$ receives a beacon during this period, $D_N$ will assign the device which transmitted the beacon packet (e.g., $D_{N2}$) as its leader node $L_N$, and stores the unique node identifier received in this packet as being the id of the network's root node $R_N$. The device $D_N$ also retransmits the leader node and root node information in a protocol packet to $D_{N2}$, to cause $D_{N2}$ to set itself as a leader node $L_N$.
5. Based on the state of the device $D_N$ when it receives an election protocol packet, the following actions may be performed by $D_N$: If $D_N$ is in the NP state, $D_N$ retransmits the election protocol packet, setting $D_{N2}$ as its leader node $L_N$ if the unique identifier $E_{id}$ in the election protocol packet has precedence over the $E_{id}$ assigned to $D_N$ when it was commissioned on the network. If $D_N$ is in the QS state, $D_N$ retransmits the election protocol packet, and if the unique identifier $E_{id}$ in the election protocol packet has precedence over the $E_{id}$ that $D_N$ received and stored in a prior election protocol packet, then $D_N$ sets $D_{N2}$ as it leader node $L_N$. If the unique identifier $E_{id}$ in the election protocol packet does not have precedence over the $E_{id}$ that $D_N$ received and stored in a prior election protocol packet, then $D_N$ retransmits the protocol packet with the stored id of its leader node $L_N$. If $D_N$ is in the $P_D$ state, $D_N$ responds to the election protocol packet to cause $D_{N2}$ to join the network it is part of. If $D_N$ is a leaf node it is promoted to a leader node.

6. If $D_N$ is in the $P_D$ state when it receives an election protocol packet comprising its assigned election identifier $E_{id}$, it assigns itself as Root Node $R_N$.
7. If $D_N$ is in the $P_D$ state when it receives an election protocol packet comprising its identifier as a leader node, it assigns itself to be a leader node.
8. If $D_N$ is in the $P_D$ state and does not receive a beacon for a pre-defined amount of time, it transitions into the QS state. It can return to the state of participating device $P_D$ if it receives a beacon from its previously elected network during this time. On the other hand if the device continues not to receive any beacons, it will trigger election with the unique identifier.
9. If a leader node $L_N$ does not receive a beacon packet with its identifier marked as leader for a pre-defined amount of time, it will demote itself to a leaf node $l_N$.
10. If a leaf node $l_N$ receives a beacon packet with its identifier marked as a leader, it will promote itself to a leader node $L_N$.

The election process converges by electing the device which initiated the election or the device which has the election protocol identifier $E_{id}$ with a preponderance of identifiers overall in the election network as the Root Node $R_N$ and the devices which retransmit the election packets as Leader Nodes $L_N$.

Packet loss computes the amount of packets successfully received from a particular node. While a node selects a node as leader, it also takes into account the packet loss of the communication channel. For this, optimizations are done only after forming the first topology. Each node computes the amount of packet loss associated with the protocol packets with its leader. and switches to a different leader if that node has better packet loss parameters. If the network is used for bidirectional communication, leader also collects such loss parameters and pass this information to the node so that it can have better heuristic. The node will decide on which leader to attach to by checking if the packet loss is lower than permissible limits.

HOP information in Keep alive gives the number of intermediate nodes it took from ROOT Node to reach that particular node. The algorithm tries to reduce the HOP. But at the same time, it should also ensure that the packet loss is not high with that optimization. So it monitors the protocol packets of keep alive and attaches to the leader node which is further away towards root and thereby reducing the HOP from the Root node.

Signal strength is a parameter which shows how far or how reliable the communication is with its neighbor. The higher the signal strength, the lower the impact of it towards packet loss. A node can select its leader which has higher signal strength. However, this should not impact on the spread of the network. So signal strength along with packet loss is used as heuristic while selecting a node as a leader.

In order to ensure that all devices are always connected, a beacon packet is transmitted from the root node $R_N$ periodically. All the other devices will retransmit this beacon packet. If a number of consecutive beacon packets are missed, the system will reset and start the election process again.

In one configuration, a system and method may be provided for configuring mesh topology in a wireless system connecting Bluetooth Low Energy (BLE) based end devices, event sources (including sensors) and mobile/fixed gateway devices. The system and method may utilize BLE based devices attempting to orient as node of a wireless mesh network while dynamically readjusting communication links among them via wireless broadcasting. Battery powered devices (low powered devices), normal powered devices, sensor devices and other forms of manual/automated event generators, smart phone based mobile gateway devices and fixed gateway devices form individual nodes in the mesh may be utilized in this configuration. In the system or method, the mesh network would have no or very limited static routing available at any central location. The nodes within the system may be connected (wirelessly) and operations are performed only whenever necessary; most of the communications occur via wireless broadcasting. The low powered devices may be source of a wireless communication packet in the mesh network. For example, a wireless key fob can generate messages which should control other set of wireless devices in the proximity. The low powered devices may be destinations of wireless communication packet. For example, a mobile application may generate ON/OFF command to control a low powered window sensor device. The low powered devices may not be designed to perform broadcasting for wireless command packets intended for other recipients in the network, due to power limitation reasons. However, the normal powered devices may participate in relaying the wireless communication packets in the mesh network.

In an embodiment, the system and method for performing dynamic and non-flooding mesh formation and maintenance may involve leader node election where the mesh is initialized, an election procedure may kick started by any arbitrary initiator which may be a normal powered device. All other normal powered nodes participate in the election. Through a decentralized arbitration via wireless advertising, a fixed number of nodes are declared leaders. The rationale behind not making low powered devices candidates for leadership may be their power limitations to take part in frequent relaying of wireless command packets received by them.

The system and method may include a yield mechanism to resolve multiple parallel elections occurring in the network. In some instances, connected pairing and introduction of new wireless devices into the existing mesh network may be initiated by smart mobile applications.

In some configurations, wireless command message communication may be performed without the after effects of flooding such as congestion and collision and resulting data losses/corruption by means of selective retransmissions among leader and non-leader nodes. In order to perform this functionality, the system may be configured such that only leader nodes retransmit all the command message packets that they receive. Non-leader nodes wait for an arbitrary amount of time after they receive any inbound command message packet (referred to as current packet), and if they see any further inbound message from either a leader or a non-leader, same as the current packet, they discard it and gets into the default listening mode. In case they don't receive any further message during the above-mentioned wait period, or receives a different command packet, they broadcast the first one and gets into the default listening mode.

In some configurations, a random back off mechanism may be employed at non-leader nodes, so that leaders get priority in broadcasting messages. The random back off mechanisms may also be employed among leader nodes with closer proximities, so as to reduce the collision probability. A re-election procedure may be initiated when the number of inactive leader nodes goes beyond a threshold level ever since the mesh was formed, as identified by any of the leader nodes.

In some embodiments, the system may include battery powered wireless devices which participate in the election, command broadcasting and all relevant leader/non-leader activities. The system may also include wireless enabled constant powered devices. These may also be functionally similar to battery powered category as far as mesh operation is concerned. The system may include wireless enabled fixed gateway devices. These devices take part in introduction of new networks into the mesh. They may also send command broadcast messages arriving at them from multiple sources. The system may include mobile gateway devices. These may be functionally similar to wireless enabled fixed gateway devices. The system may also include manual/automated event trigger devices which include proximity sensors, touch sensors and other physical condition sensors. These devices may get associated with one or more user defined groupings of devices and may be battery powered wireless devices or wireless enabled constant powered devices.

A system and method of prioritizing and improving network topology in a mesh network may include a plurality of leader nodes and a plurality of leaf nodes. The system and method may provide a mesh network that prioritizes packet distribution through the designation of leader nodes. A leader node is a prioritized node in a mesh network that is able to receive and forward packets to subsequent nodes. In each mesh network region at least one leader node is elected. When the leader node receives a message it broadcast's it out to other nodes. Non-leader nodes (leaf nodes) may receive packets but not relay. Leader nodes may be identified by based on the operating environment of the device that includes that radius of a building, objects within the surrounding of the building, and signal interference.

The leader nodes may be selected as part of an election protocol that occurs during a randomized back-off period. The election protocol involves communication between the node devices in the mesh network. The selection of a leader node may be automatic and may be accomplished through a voting process where regular nodes advertise their presence to the other nodes and each node counts the number of devices that they are able to listen to. The nodes then declare through an announcement the number of devices that they are able to listen to. In this scenario the device that is able to listen to the most number of nodes selected as the leader node. In the aforementioned scenario, the leader node may be classified as a root node. Leader nodes are able to communicate with at least one other leader node. If this condition is not possible, then another node that is able to bridge the communication becomes the leader node. by having the least number of leader nodes, the nodes are prevented from flooding the mesh network with redundant packages In the system and method, broadcasting (advertisement) for talking to the leader nodes may be limited to Bluetooth Low energy (BLE) channels and/or possibly fixed channels. The broadcast to the leader nodes may be utilized to create the mesh network. During the broadcast each node advertises or tries to advertise, but only leader node relays those advertisements.

In the system and method, low power nodes may be battery powered devices that don't relay and don't listen for advertisements. These devices wake up periodically and send out information to the other devices that will be communicated through the leader node. The leader node may then forward the information through the mesh network until it reaches its desired target.

In one embodiment, a low powered node may be a motion sensor for detecting people or movement in a particular area. The device may be battery powered and a sensor such as an Infrared sensor. When the device detects movement, the motion sensor may communicate the message out to the network. The leader node may receive the message from the sensor and rebroadcast it out the next leader node. Information from a motion sensor is not constantly monitored, as such, the implementation of the motion sensor as a low powered node allows for improved utilization of network resources. The motion sensor messages may allow for another node in the mesh network to perform a programmed action based on the received message. For instance, if the motion sensor detects movement through its sensor, the broadcasted message may trigger a different node to turn on lights within a given area.

In another embodiment, the low powered node may be a light sensor, humidity sensor, temperature sensor, etc., that serve as environmental detectors. These detectors may provide broadcast a message when specific conditions are detected that may trigger a specific action to be performed by another node in the mesh network. For instance, if a humidity sensor detects high and low humidity values, it may trigger a response to another device that may activate a dehumidifier or humidifier, respectively as configured by a user.

In another configuration, a node may be provided as a fixed appliance such as fans, AC units, smart plugs, smart switches, etc. These fixed appliances with network connectivity may be the easiest way to deploy mesh network as they offer a preexisting infrastructure, have power readily available to them, would provide wide coverage across an area due to their distribution, and would potentially allow for facilitated hardware replacement and/or upgrades.

In one scenario, the mesh network may be operated within an office/warehouse environment. In this scenario each tube light is linked with one or more sensor, such as an IR sensor. The IR sensor may detect the presence and the location of the person within the environment and activate the appropriate lights until they are turned on/brightened/dim/selectively turn off in accordance with the preferences configured for the system. The node devices in this particular scenario may be BLE devices/Mesh Node Tech [application layer]) that were integrated with tube light.

A mesh network is a type of machine communication system in which each client node (sender and receiver of data messages) of the network also relays data for the network. All client nodes cooperate in the distribution of data in the network. Mesh networks may in some cases also include designated router and gateway nodes (e.g., nodes that connect to an external network such as the Internet) that are or are not also client nodes. The nodes are often laptops, cell phones, or other wireless devices. The coverage area of the nodes working together as a mesh network is sometimes called a mesh cloud.

Mesh networks can relay messages using either a flooding technique or a routing technique. Flooding is a routing algorithm in which every incoming packet, unless addressed to the receiving node itself, is forwarded through every outgoing link of the receiving node, except the one it arrived on. With routing, the message is propagated through the network by hopping from node to node until it reaches its destination. To ensure that all its paths remain available, a mesh network may allow for continuous connections and may reconfigure itself around broken paths. In mesh networks there is often more than one path between a source and a destination node in the network. A mobile ad hoc network (MANET) is usually a type of mesh network. MANETs also allow the client nodes to be mobile.

A wireless mesh network (WMN) is a mesh network of radio nodes. Wireless mesh networks can self-form and self-heal and can be implemented with various wireless technologies and need not be restricted to any one technology or protocol. Each device in a mobile wireless mesh network is free to move, and will therefore change its routing links among the mesh nodes accordingly.

Mesh networks may be decentralized (with no central server) or centrally managed (with a central server). Both types may be reliable and resilient, as each node needs only transmit as far as the next node. Nodes act as routers to transmit data from nearby nodes to peers that are too far away to reach in a single hop, resulting in a network that can span larger distances. The topology of a mesh network is also reliable, as each node is connected to several other nodes. If one node drops out of the network, due to hardware failure or moving out of wireless range, its neighbors can quickly identify alternate routes using a routing protocol.

Referring to FIG. 1, an exemplary wireless mobile mesh network 100 includes a server node 102, a router node 110, a router node 112, a router node 106, a router node 104, a gateway node 114, and a gateway node 108. The server node 102, the gateway node 114, and the gateway node 108 also operate as router nodes. Every node in the network participates in the routing of communications in the wireless mobile mesh network 100. The gateway node 114 and gateway node 108 provide an interface between the wireless mobile mesh network 100 and an external network, such as the Internet or a local area network. The server node 102 provides some level of centralized management for the wireless mobile mesh network 100, and may be optional if each node acts autonomously to self-manage. One or more of the nodes may be fixed in location, some of the nodes may be mobile, or all of the nodes may be mobile.

In some conventional mesh networks, control and management is implemented utilizing remote transmitters (e.g., beacons) that emit an identifier to compatible receiving devices (mesh nodes), triggering delivery of a targeted push notification. These transmitters operate as part of a targeted notification system that includes a database of identifiers for each transmitter and targeted notifications. The emitted identifiers are unique to each transmitter, allowing the notification system to determine the location of the receiving device based on the location of the transmitter.

Conventional transmitters do not communicate with an administrator to minimize power consumption. As a result, the transmitters do not provide status information or alert administrators when mesh node battery levels are low. Conventional transmitters emit static identifiers. These identifiers are susceptible to spoofing. A solution is needed to minimize power consumption on battery powered mesh node devices and reduce susceptibility to spoofing of transmitters while permitting communication between the transmitters and an administrator.

Figure 2:
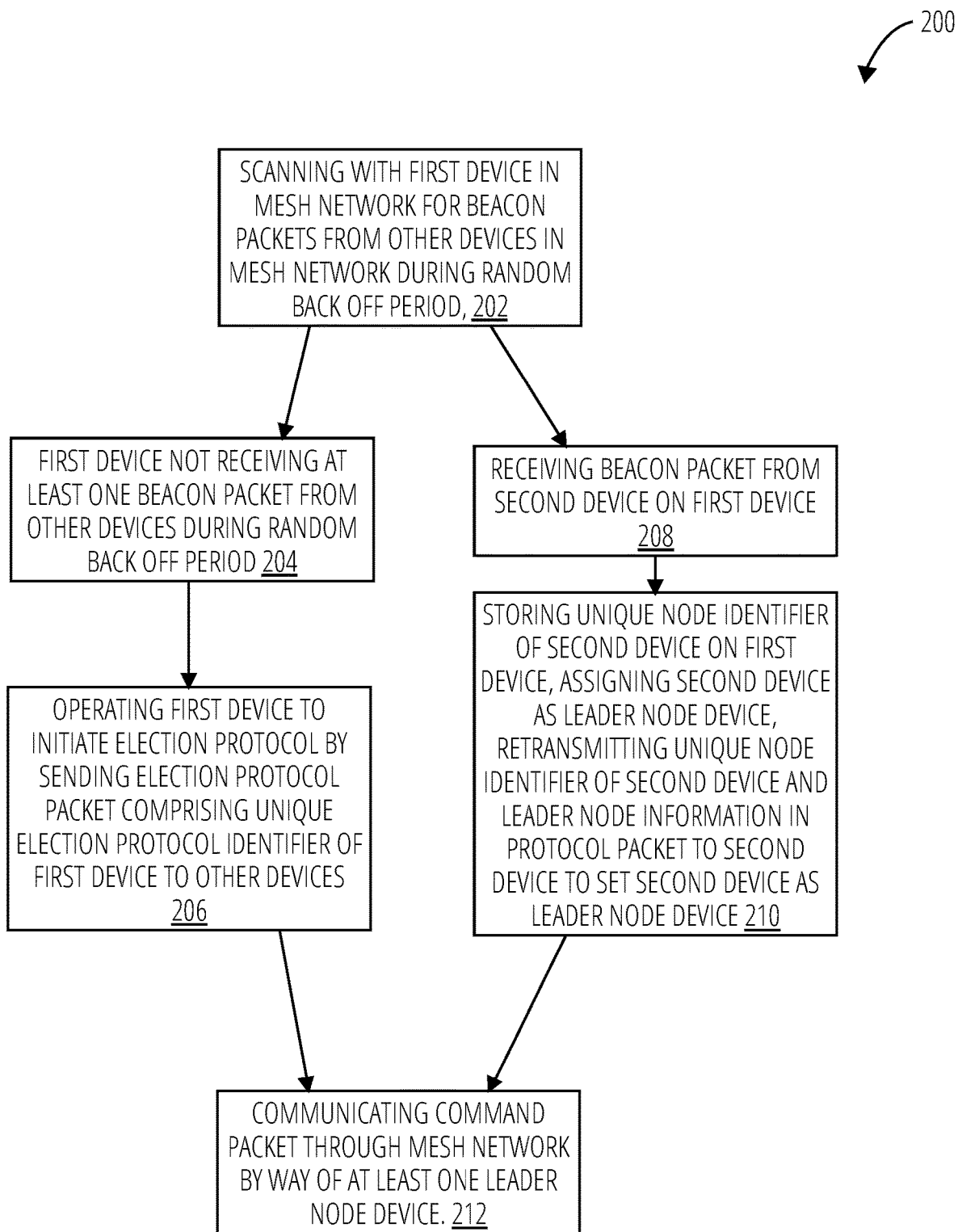
FIG. 2 illustrates a method 200 in accordance with one embodiment.

Referencing FIG. 2, a method 200 of operating a system with dynamic wireless network topology with reduced spectrum flooding involves scanning with a first device in mesh network for beacon packets from other devices in the mesh network during a random back off period, the beacon packets comprising a unique node identifier of the other devices (block 202). In block 204, the method 200 detects that the first device has not received at least one beacon packet from the other devices during the random back off period. In block 206, the method 200 operates the first device in response to the block 204 to initiate an election protocol by sending an election protocol packet comprising a unique election protocol identifier of the first device to the other devices. In block 208, the method 200 detects that a beacon packet from the second device is received on the first device. In block 210, the method 200 operates the first device in response to the block 208 to store the unique node identifier of a second device on the first device, assign the second device as a leader node device, retransmit the unique node identifier of the second device and leader node information in a protocol packet to the second device to set the second device as the leader node device. In block 212, the method 200 communicates a command packet through the mesh network by way of at least one leader node device.

In some configurations operating the mesh network may involve identifying participating device states of devices in the mesh network as leader node devices, leaf node devices, and root node devices through the election protocol. The leader node devices may be configured to participate in re-transmitting data packets in the mesh network. The leaf node devices may be configured to not participate in re-transmitting the data packets in the mesh network. The root node devices may be configured to initiate the election protocol during the random back off period.

In some configurations, the method of operating a system with dynamic wireless network topology with reduced spectrum flooding may involve operating a first device to set the second device as the leader node and retransmit the election protocol packet to the second device, if the unique election protocol identifier of the second device in the election protocol packet has precedence over the unique election protocol identifier of the first device, in response to the first device receiving the election protocol packet after being powered on.

In some configurations, the method of operating a system with dynamic wireless network topology with reduced spectrum flooding may involve operating the first device to set the second device as the leader node and retransmit the election protocol packet, if the unique election protocol identifier in the election protocol packet has precedence over the unique election protocol identifier of the first device that it received and stored in a prior election protocol packet, in response to the first device receiving the election protocol packet while being temporarily unable to communicate with the leader node device.

In some configurations, the method of operating a system with dynamic wireless network topology with reduced spectrum flooding may involve operating the first device to set itself as the leader node device and retransmit a previous election protocol packet with the unique election protocol identifier associated with the first device, if the unique election protocol identifier in the election protocol packet, received from the second device, does not have precedence over the unique election protocol identifier of the first device from the previous election protocol, in response to the first device receiving the election protocol packet while being temporarily unable to communicate with the leader node device.

In some configurations, the method of operating a system with dynamic wireless network topology with reduced spectrum flooding may involve operating the first device to set itself as a leader node device and respond to a third device to join its current mesh network, in response to the first device being a leaf node device when receiving the election protocol packet from the third device.

In some configurations, the method of operating a system with dynamic wireless network topology with reduced spectrum flooding may involve operating the first device to assign itself as the root node device, in response to the first device receiving the election protocol packet with the unique election protocol identifier of the first device.

In some configurations, the method of operating a system with dynamic wireless network topology with reduced spectrum flooding may involve operating the first device to assign itself as the leader node device, in response to the first device receiving the protocol packet with the leader node information and the unique node identifier of the first device.

In some configurations, the method of operating a system with dynamic wireless network topology with reduced spectrum flooding may involve configuring the first device from a participating device state on the mesh network into a limited operation state where it is temporarily unable to communicate with the leader node device, in response to the first device not receiving any packets from the other devices for a pre-defined amount of time while being the participating device state on the mesh network.

In some configurations, the method of operating a system with dynamic wireless network topology with reduced spectrum flooding may involve configuring the first device out of the limited operation state and into its previous participating device state, in response to receiving at least one packet from another device on its pervious mesh network.

In some configurations, the method of operating a system with dynamic wireless network topology with reduced spectrum flooding may involve configuring the first device to initiate a new election protocol and send out a new election protocol packet, in response to the first device not receiving any packets from the other devices for a pre-defined amount of time while in the limited operation state.

In some configurations, the method of operating a system with dynamic wireless network topology with reduced spectrum flooding may involve configuring the first device as a leaf node device, in response to the first device not receiving the protocol packet from the other devices with the leader node information and the unique node identifier for the first device.

In some configurations, the method of operating a system with dynamic wireless network topology with reduced spectrum flooding may involve configuring the first device as the leader node device from a leaf node device, in response to the first device receiving the protocol packet from the other devices with the leader node information and the unique node identifier for the first device.

Figure 3:
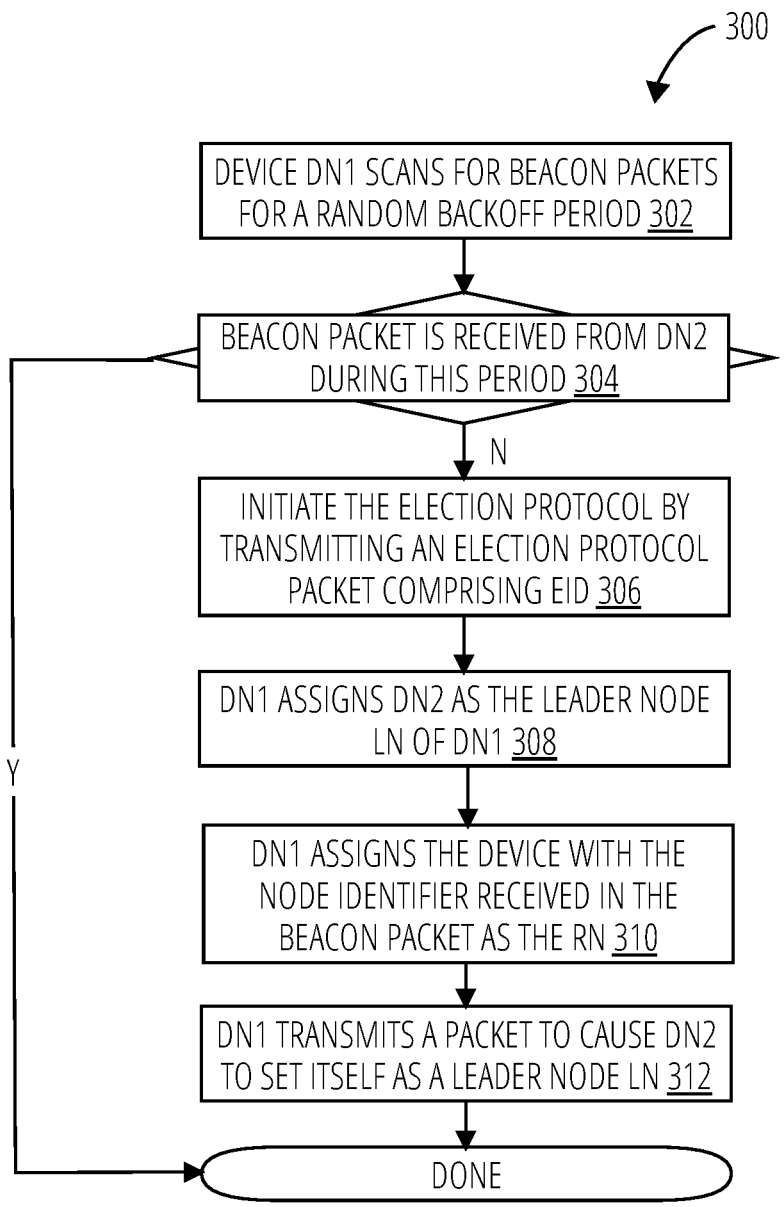
FIG. 3 illustrates an election initiation process 300 in accordance with one embodiment.

FIG. 3 illustrates an election initiation process 300. The election initiation process 300 begins as a device DN1 scans for beacon packets for a random backoff period 302. If a beacon packet is received from DN2 during this period 304, the process concludes.

Otherwise DN1 will initiate the election protocol by transmitting an election protocol packet comprising Eid 306. Also, DN1 assigns DN2 as the leader node LN of DN1 308, DN1 assigns the device with the node identifier received in the beacon packet as the RN 310, and DN1 transmits a packet to cause DN2 to set itself as a leader node LN 312.

Figure 4:
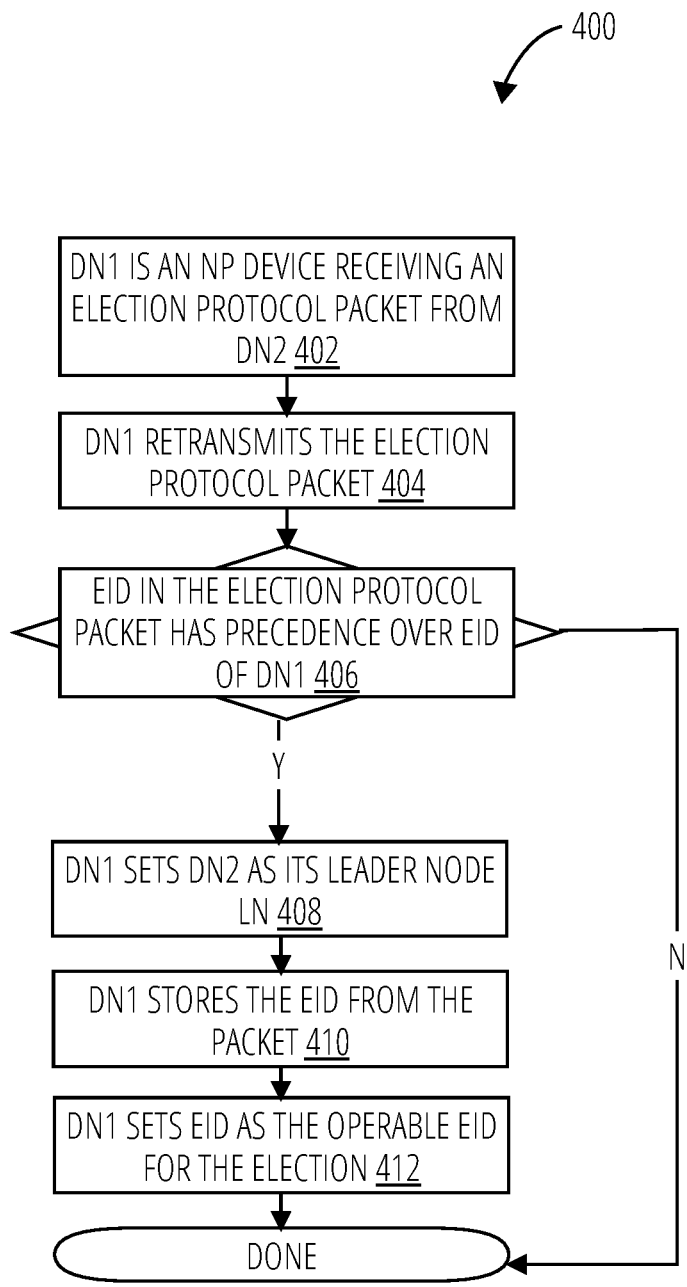
FIG. 4 illustrates aspects of an election protocol 400 in accordance with one embodiment.

FIG. 4 illustrates aspects of an election protocol 400. These aspects may occur when DN1 is an NP device receiving an election protocol packet from DN2 402. In this case, DN1 retransmits the election protocol packet 404. If the Eid in the election protocol packet has precedence over Eid of DN1 406, then DN1 sets DN2 as its leader node LN 408, DN1 stores the Eid from the packet 410, and DN1 sets Eid as the operable Eid for the election 412.

Figure 5:
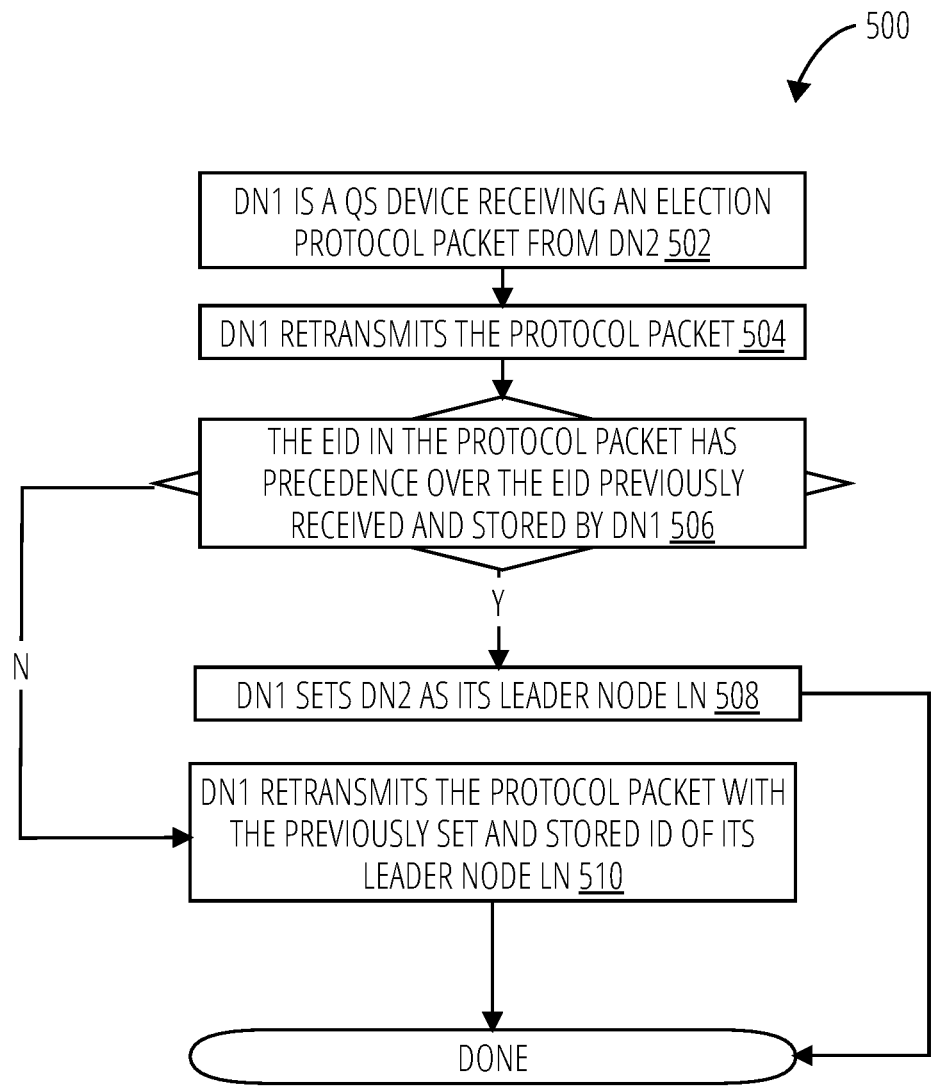
FIG. 5 illustrates aspects of an election protocol 500 in accordance with one embodiment.

FIG. 5 illustrates aspects of an election protocol 500 when DN1 is a QS device receiving an election protocol packet from DN2 502. In this case, DN1 retransmits the protocol packet 504. If the Eid in the protocol packet has precedence over the Eid previously received and stored by DN1 506, DN1 sets DN2 as its leader node LN 508, otherwise DN1 retransmits the protocol packet with the previously set and stored id of its leader node LN 510.

Figure 6:
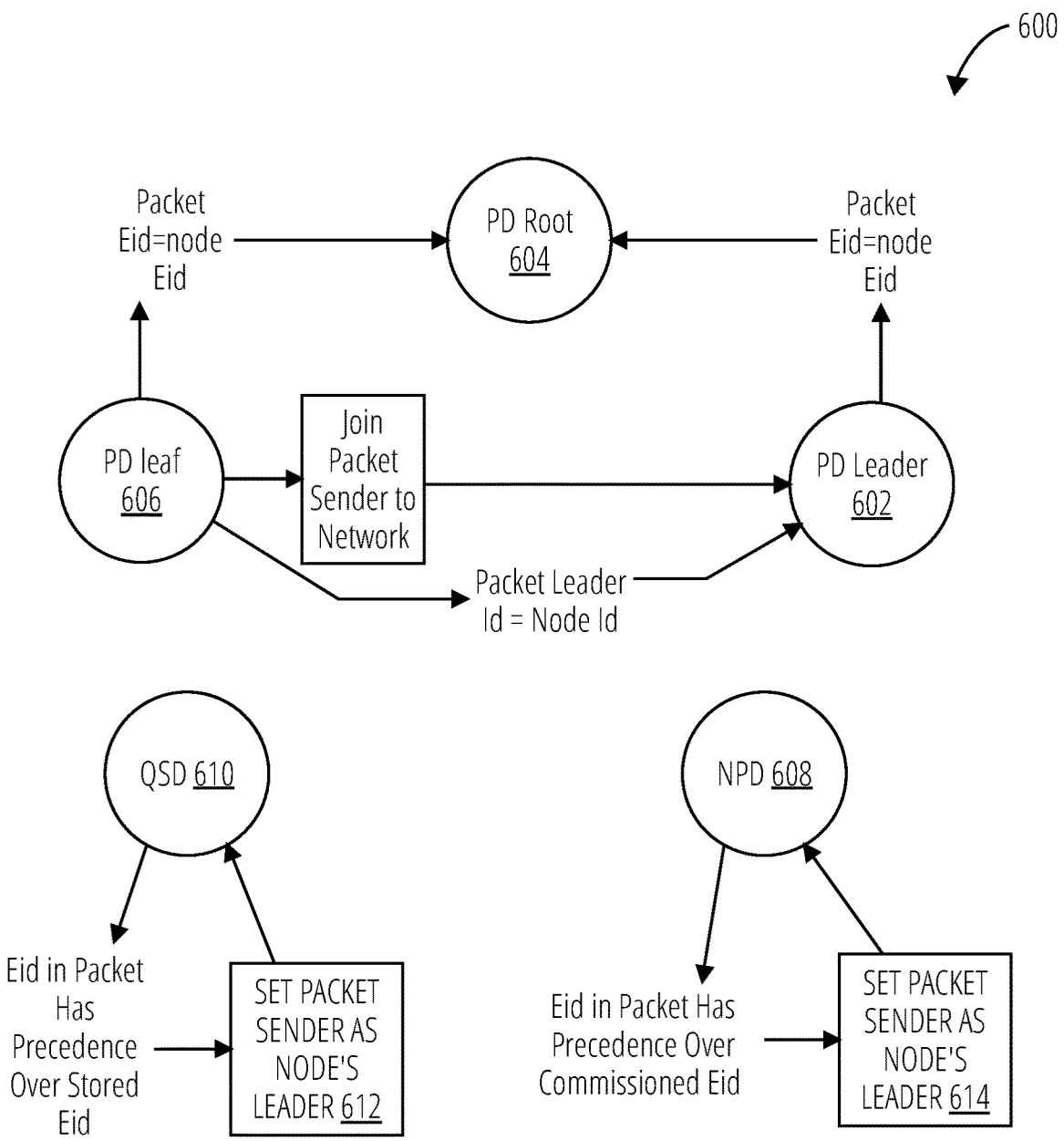
FIG. 6 illustrates a system 600 in accordance with one embodiment.

FIG. 6, a system 600 shows a root participating device 604 receives a packet Eid with the node Eid from a leaf participating device 606 and a leader participating device 602. The leaf participating device 606 communicates a node Eid to the leader participating device 602 when the leaf participating device 606 joins the packet sender to the network. The leader participating device 602 then communicates the packet EiD to the root participating device 604. A quasi state device 610 checks to see if an Eid in packet has precedence over stored Eid, if so, the quasi state device 610 performs an action 612 that set packet sender as node's leader. A non-participating device 608 checks to see if a Eid in packet has precedence over commissioned Eid, if so, then the non-participating device 608 performs an action 614 that set packet sender as node's leader.

Figure 7:
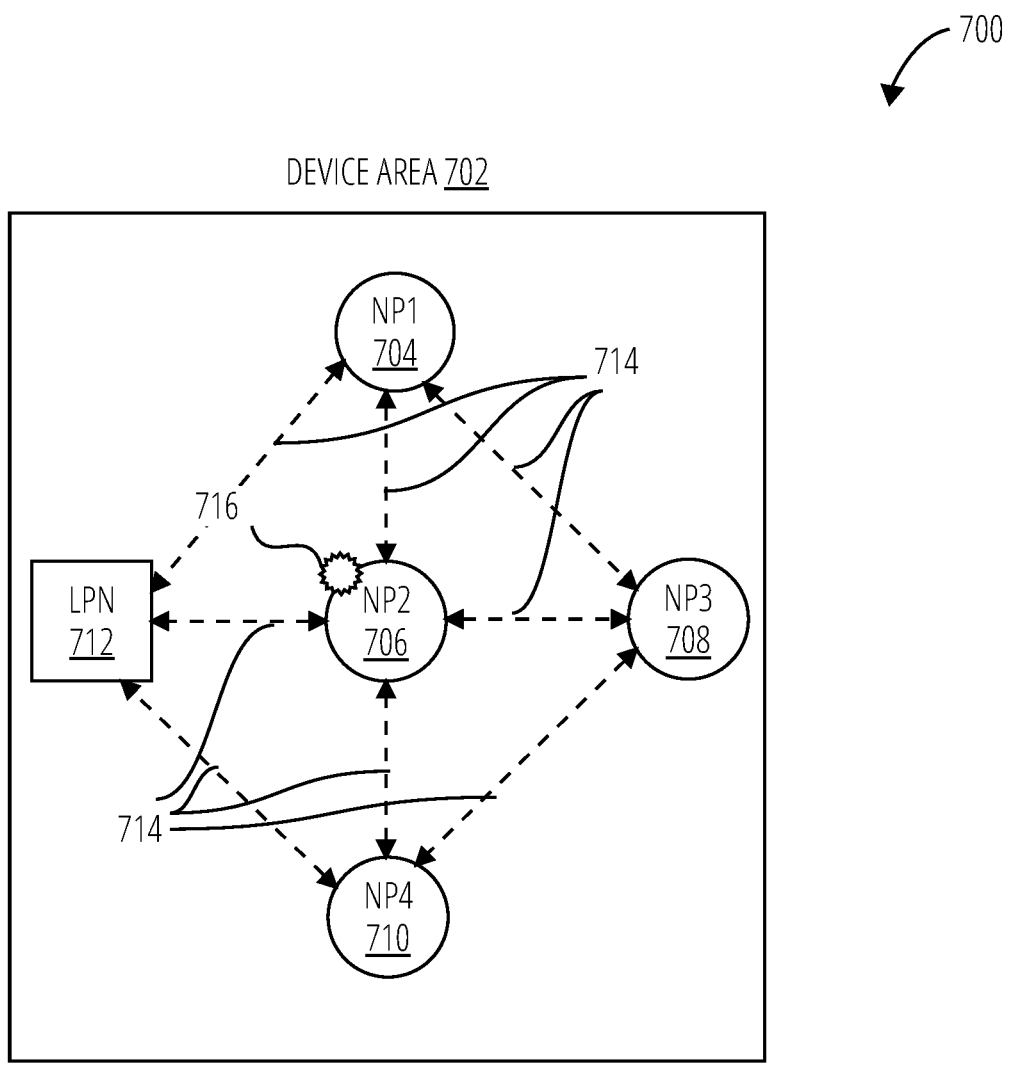
FIG. 7 illustrates a mesh network 700 in accordance with one embodiment.

FIG. 7 illustrates an election process for a leader node in mesh network 700. Mesh network 700 comprises normal powered node one 704, normal powered node two 706, normal powered node three 708, normal powered node four 710, and low powered node 712 in a device area 702. The normal powered node one 704, normal powered node two 706, normal powered node three 708, and normal powered node four 710 are nodes without many operating restrictions due to power consumption.

The mesh network 700 shows the wireless visibility 714 between the devices with normal powered node one 704 communicating visibility with low powered node 712, normal powered node two 706, and normal powered node three 708. Normal powered node four 710 communicates wireless visibility 714 with low powered node 712, normal powered node two 706, and normal powered node three 708 but not normal powered node one 704. Due to the position of normal powered node two 706 being able to communicate with the normal powered node one 704 and normal powered node four 710 as well as with low powered node 712 and normal powered node three 708, a unique election protocol identifier $E_{id}$ sent from the normal powered node two 706 would take precedence over other unique node identifiers. The position of the normal powered node two 706 allows it to be identified by the normal powered node one 704, normal powered node three 708, normal powered node four 710, and low powered node 712 as the node leader 716 within the device area 702.

FIG. 8 through FIG. 11 illustrate a scenario where a signaling device 802 enters the device area 702 causing the normal powered node four 710 to activate without any direct visibility between the signaling device 802 and the normal powered node four 710. In the provided scenario, the signaling device 802 may be a low powered device that the user carries around such as a key fob while the normal powered node four 710 may be a smart lightbulb. The normal powered node four 710 may be activated (e.g., turn on, turn off, etc.) upon receiving the advertised command packet 806 from the signaling device 802 through the mesh network 700.

Figure 8:
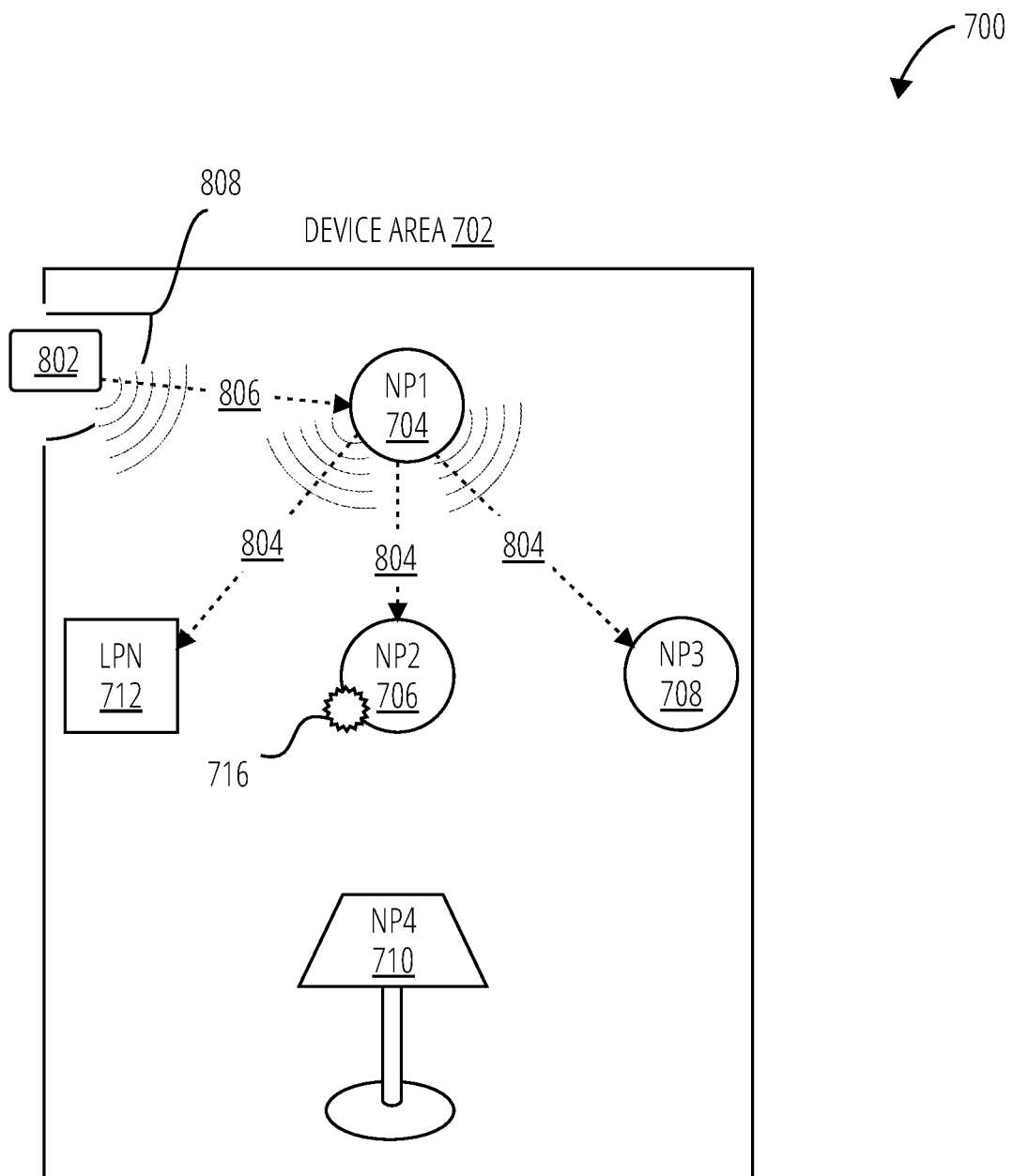
FIG. 8 illustrates a mesh network 700 in accordance with one embodiment.

FIG. 8 illustrates the signaling device 802 entering the device area 702 through a door 808. The signaling device 802 advertises the command packet 806 to the closest node which is normal powered node one 704. After the normal powered node one 704 receives the command packet 806 it rebroadcasts the packet as a command packet 804 to the low powered node 712, the normal powered node two 706, and to the normal powered node three 708. Since the normal powered node one 704 does not have visibility with the normal powered node four 710, the normal powered node four 710 does not receive the command packet 804.

Figure 9:
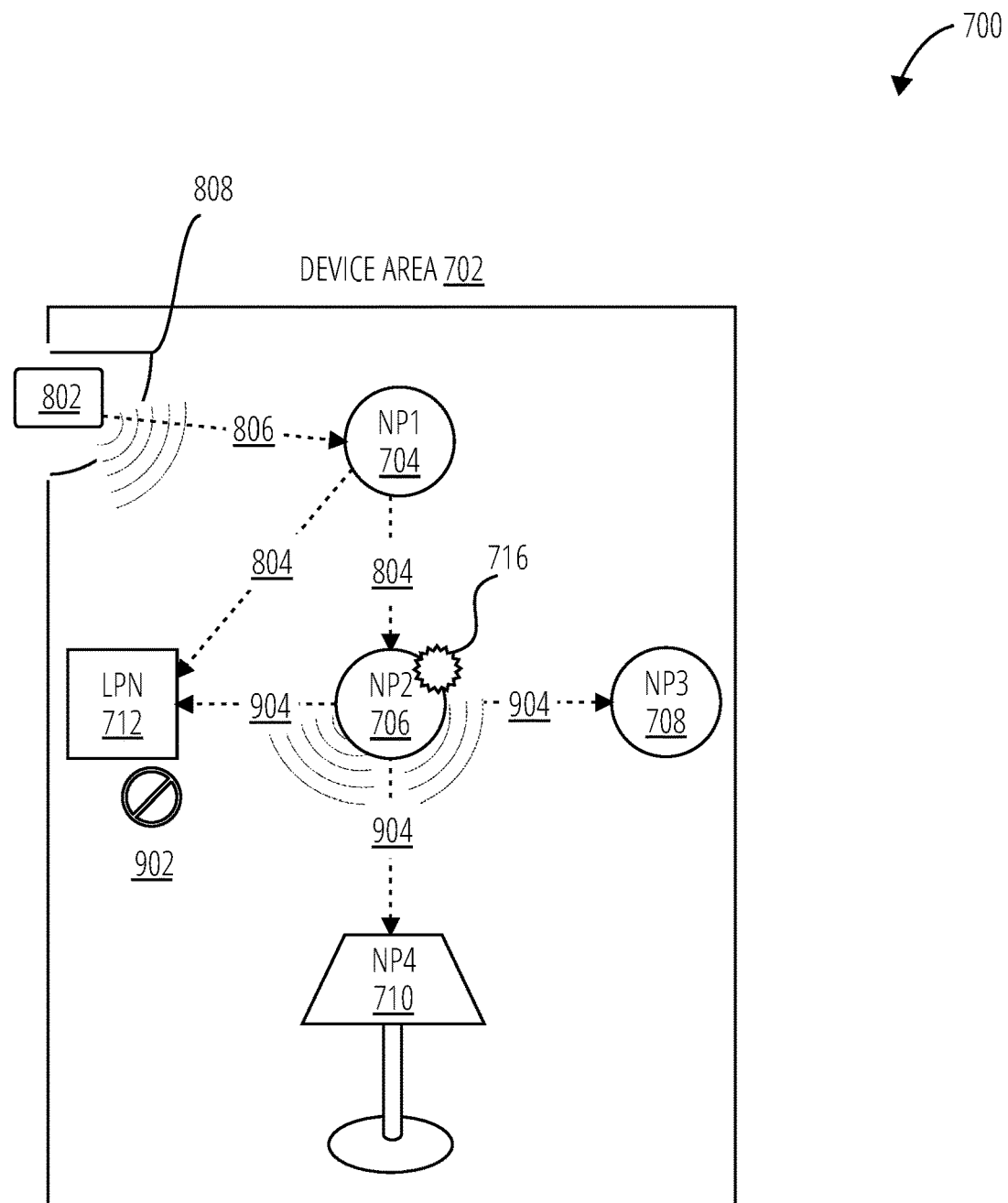
FIG. 9 illustrates a mesh network 700 in accordance with one embodiment.

FIG. 9 illustrates that the command packet 804 sent from the normal powered node one 704 to the low powered node 712 is a failed packet 902. The low powered node 712 may be able to receive the command packet 804 randomly depending on its communication window with the rest of the network but the low powered node 712 will discard the packet as it does not rebroadcast. The normal powered node two 706 being the node leader 716 would receive the command packet 804 a rebroadcast it as a command packet 904 to the normal powered node three 708, the normal powered node four 710 and the low powered node 712. Similarly, the command packet 904 to the low powered node 712 would be a failed packet 902 as the low powered node 712 does not rebroadcast.

Figure 10:
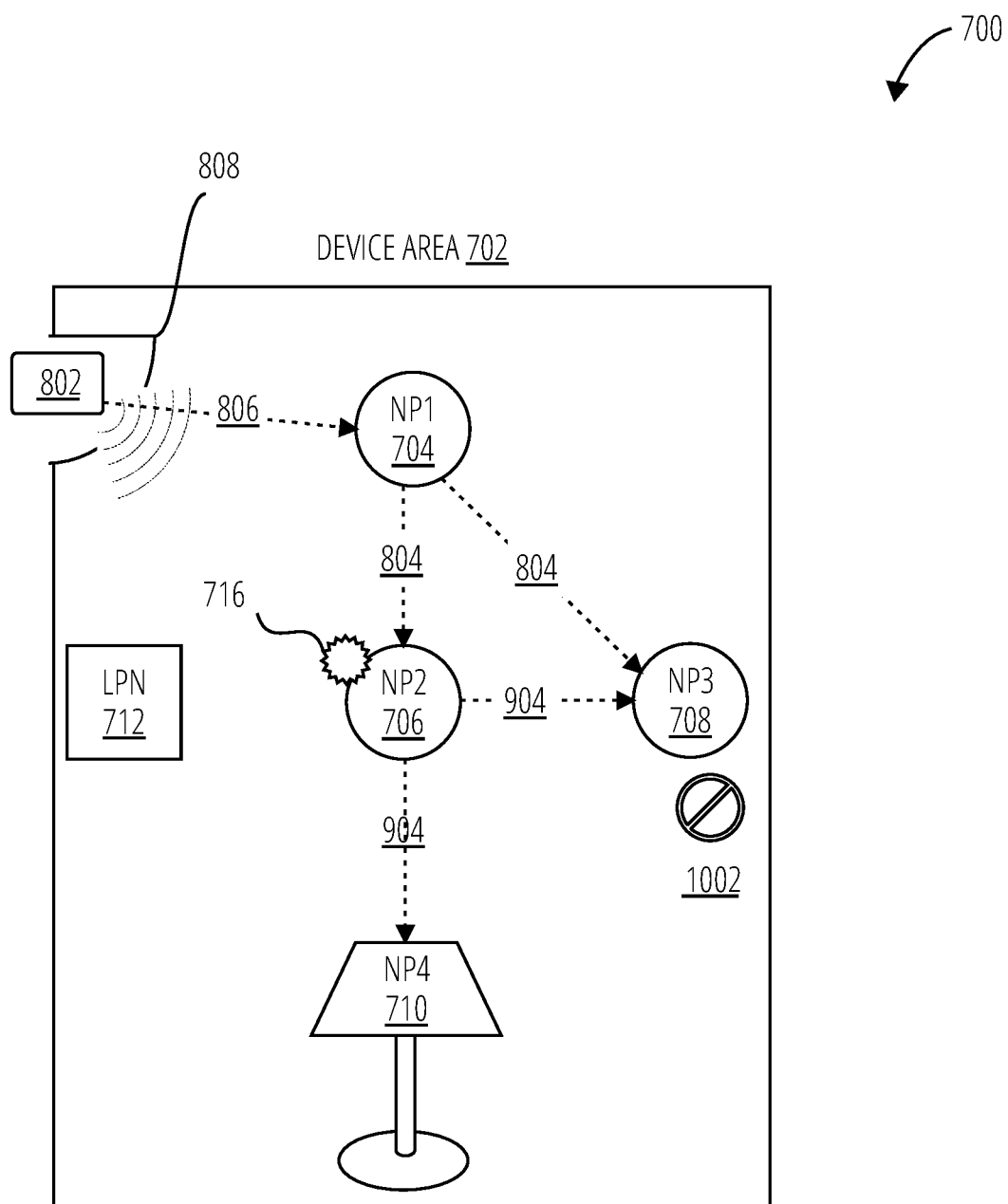
FIG. 10 illustrates a mesh network 700 in accordance with one embodiment.

In FIG. 10, the normal powered node three 708 is seen receiving the command packet 804 from the normal powered node one 704 and the command packet 904 from the normal powered node two 706. Unlike the low powered node 712, the normal powered node three 708 is capable of rebroadcasting but performs a packet drop 1002 for both the command packet 804 and the command packet 904. The command packet 904 is rebroadcasted by the normal powered node two 706 after the normal powered node three 708 has receiving the command packet 804. Based on the status of the normal powered node two 706 as the node leader 716, the normal powered node three 708 understands that the packet is already being rebroadcasted and drops the packet allowing the normal powered node two 706 to broadcast the command packet 904 to the normal powered node four 710.

Figure 11:
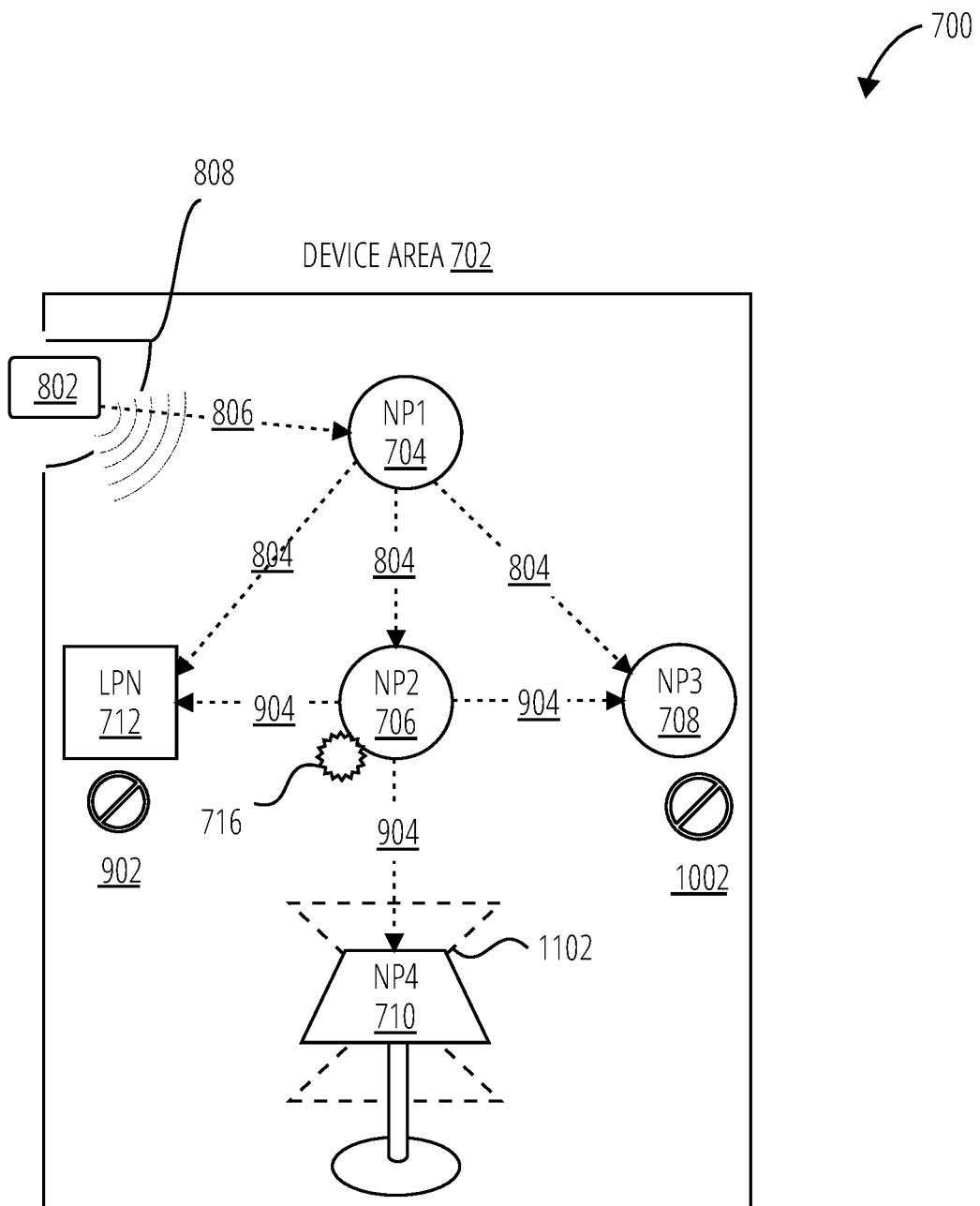
FIG. 11 illustrates a mesh network 700 in accordance with one embodiment.

In FIG. 11, the normal powered node four 710 receives the command packet 904 from the normal powered node two 706 without receiving redundant packages from the low powered node 712 or the normal powered node three 708. The normal powered node four 710 accepts the command packet 904 and executes activation 1102 turning on its lights.

Figure 12:
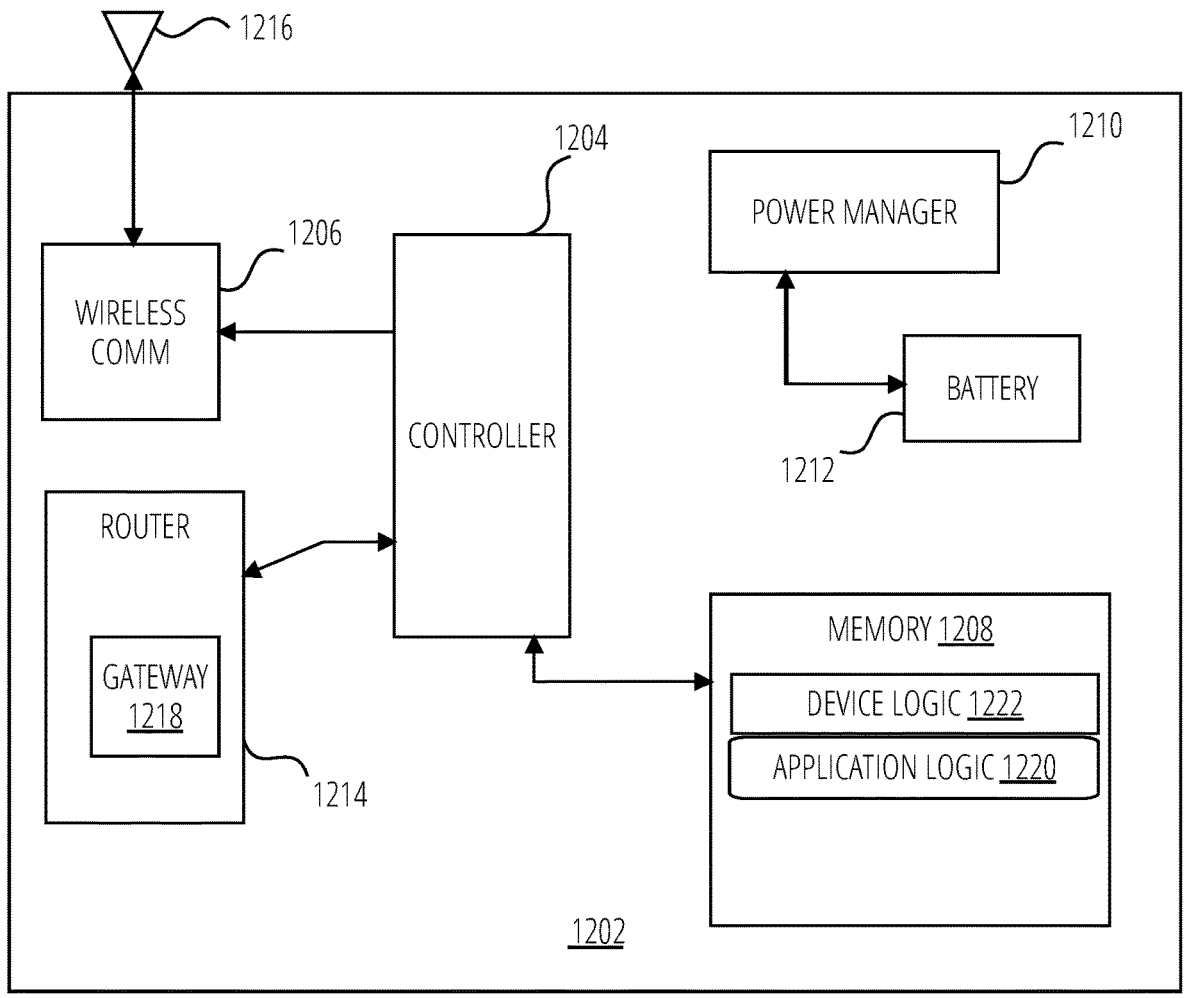
FIG. 12 illustrates an embodiment of a mobile wireless node 1202.

Referring to FIG. 12, a mobile wireless node 1202 includes an antenna 1216, a signal processing and system control 1204, a wireless communication 1206, a memory 1208, a power manager 1210, a battery 1212, a router 1214, a mobile wireless node 1202, and a gateway 1218. The mobile wireless node 1202 may act as a node in a mesh network and perform some or all of the actions described previously.

The signal processing and system control 1204 controls and coordinates the operation of other components as well as providing signal processing for the mobile wireless node 1202. For example the signal processing and system control 1204 may extract baseband signals from radio frequency signals received from the wireless communication 1206 logic, and process baseband signals up to radio frequency signals for communications transmitted to the wireless communication 1206 logic. The signal processing and system control 1204 may comprise a central processing unit, digital signal processor, one or more controllers, or combinations of these components.

The wireless communication 1206 includes memory 1208 which may be utilized by the signal processing and system control 1204 to read and write instructions (commands) and data (operands for the instructions). The memory 1208 may include device logic 1222 and application logic 1220.

The router 1214 performs communication routing to and from other nodes of a mesh network (e.g., wireless mobile mesh network 100) in which the mobile wireless node 1202 is utilized. The router 1214 may optionally also implement a network gateway 1218.

The components of the mobile wireless node 1202 may operate on power received from a battery 1212. The battery 1212 capability and energy supply may be managed by a power manager 1210.

The mobile wireless node 1202 may transmit wireless signals of various types and range (e.g., cellular, Wi-Fi, Bluetooth, and near field communication i.e. NFC). The mobile wireless node 1202 may also receive these types of wireless signals. Wireless signals are transmitted and received using wireless communication 1206 logic coupled to one or more antenna 1216. Other forms of electromagnetic radiation may be used to interact with proximate devices, such as infrared (not illustrated).

Terminology and Interpretation

Those skilled in the art will appreciate that the processes described herein may be implemented as logic in one or more devices.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A method of operating a system with dynamic wireless network topology with reduced spectrum flooding, the method comprising:
    scanning with a first device in a mesh network for beacon packets from other devices in the mesh network during a random back off period, the beacon packets comprising a unique node identifier of the other devices;
    operating the first device to initiate an election protocol by sending an election protocol packet comprising a unique election protocol identifier of the first device to the other devices, in response to the first device not receiving at least one beacon packet from the other devices during the random back off period;
    storing the unique node identifier of a second device on the first device, assigning the second device as a leader node device, retransmitting the unique node identifier of the second device and leader node information in a protocol packet to the second device to set the second device as the leader node device, in response to receiving a beacon packet from the second device on the first device;
    operating the first device to set the second device as the leader node and retransmit the election protocol packet to the second device, if the unique election protocol identifier of the second device in the election protocol packet has precedence over the unique election protocol identifier of the first device, in response to the first device receiving the election protocol packet after being powered on; and
    communicating a command packet through the mesh network by way of at least one leader node device.

2. The method of claim 1 further comprises:
    identifying participating device states of devices in the mesh network as leader node devices, leaf node devices, and root node devices through the election protocol;
    configuring the leader node devices to participate in re-transmitting data packets in the mesh network;
    configuring the leaf node devices to not participate in re-transmitting the data packets in the mesh network; and
    configuring the root node devices to initiate the election protocol during the random back off period.

3. The method of claim 2 further comprising:
    operating the first device to set itself as the leader node device and respond to a third device to join its current mesh network, in response to the first device being a leaf node device when receiving the election protocol packet from the third device.

4. The method of claim 2 further comprising:
    operating the first device to assign itself as the root node device, in response to the first device receiving the election protocol packet with the unique election protocol identifier of the first device.

5. The method of claim 2 further comprising:
    operating the first device to assign itself as the leader node device, in response to the first device receiving the protocol packet with the leader node information and the unique node identifier of the first device.

6. The method of claim 2 further comprising:
    configuring the first device from a participating device state on the mesh network into a limited operation state where it is temporarily unable to communicate with the leader node device, in response to the first device not receiving any packets from the other devices for a pre-defined amount of time while being the participating device state on the mesh network.

7. The method of claim 6 further comprising:
    configuring the first device out of the limited operation state and into its previous participating device state, in response to receiving at least one packet from another device on its pervious mesh network.

8. The method of claim 6 further comprising:
    configuring the first device to initiate a new election protocol and send out a new election protocol packet, in response to the first device not receiving any packets from the other devices for a pre-defined amount of time while in the limited operation state.

9. The method of claim 2 further comprising:
    configuring the first device as a leaf node device, in response to the first device not receiving the protocol packet from the other devices with the leader node information and the unique node identifier for the first device.

10. The method of claim 2 further comprising:
    configuring the first device as the leader node device from a leaf node device, in response to the first device receiving the protocol packet from the other devices with the leader node information and the unique node identifier for the first device.

11. A method of operating a system with dynamic wireless network topology with reduced spectrum flooding, the method comprising:
    scanning with a first device in a mesh network for beacon packets from other devices in the mesh network during a random back off period, the beacon packets comprising a unique node identifier of the other devices;
    operating the first device to initiate an election protocol by sending an election protocol packet comprising a unique election protocol identifier of the first device to the other devices, in response to the first device not receiving at least one beacon packet from the other devices during the random back off period;
    storing the unique node identifier of a second device on the first device, assigning the second device as a leader node device, retransmitting the unique node identifier of the second device and leader node information in a protocol packet to the second device to set the second device as the leader node device, in response to receiving a beacon packet from the second device on the first device;

operating the first device to set the second device as the leader node and retransmit the election protocol packet, if the unique election protocol identifier in the election protocol packet has precedence over the unique election protocol identifier of the first device that it received and stored in a prior election protocol packet, in response to the first device receiving the election protocol packet while being temporarily unable to communicate with the leader node device; and communicating a command packet through the mesh network by way of at least one leader node device.

12. A method of operating a system with dynamic wireless network topology with reduced spectrum flooding, the method comprising:

scanning with a first device in a mesh network for beacon packets from other devices in the mesh network during a random back off period, the beacon packets comprising a unique node identifier of the other devices;

operating the first device to initiate an election protocol by sending an election protocol packet comprising a unique election protocol identifier of the first device to the other devices, in response to the first device not receiving at least one beacon packet from the other devices during the random back off period;

storing the unique node identifier of a second device on the first device, assigning the second device as a leader node device, retransmitting the unique node identifier of the second device and leader node information in a protocol packet to the second device to set the second device as the leader node device, in response to receiving a beacon packet from the second device on the first device;

operating the first device to set itself as the leader node device and retransmit a previous election protocol packet with the unique election protocol identifier associated with the first device, if the unique election protocol identifier in the election protocol packet, received from the second device, does not have precedence over the unique election protocol identifier of the first device from the previous election protocol, in response to the first device receiving the election protocol packet while being temporarily unable to communicate with the leader node device; and communicating a command packet through the mesh network by way of at least one leader node device.

\* \* \* \* \*